Nov. 20, 1928. 1,692,715
A. WILLIAMSON
TILTING DEVICE FOR VEHICLES
Filed April 15, 1926 2 Sheets-Sheet 2
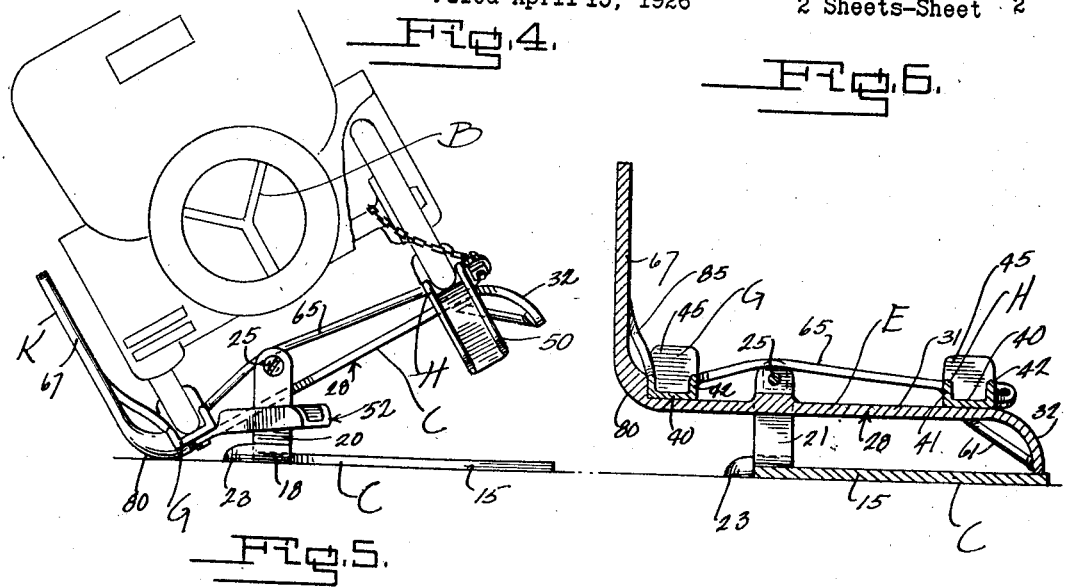
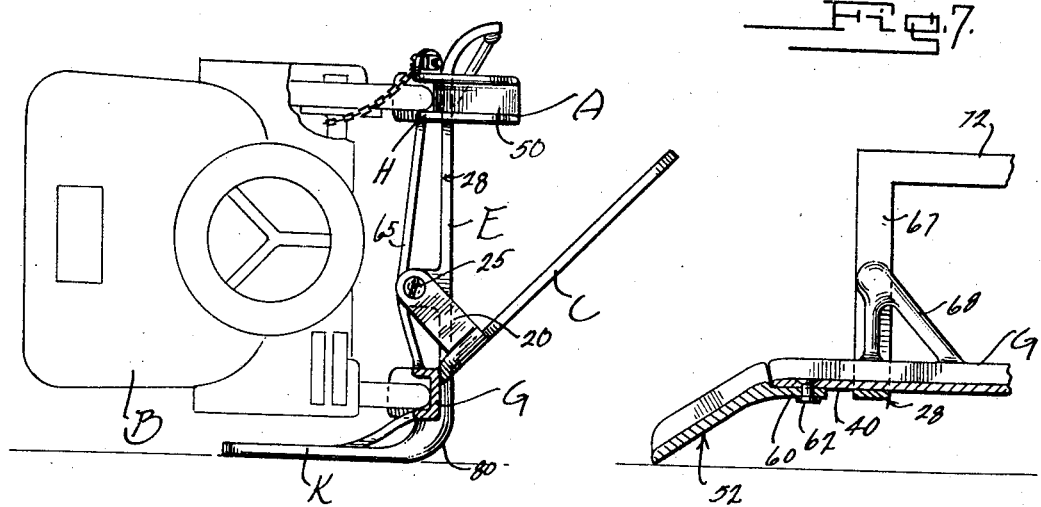
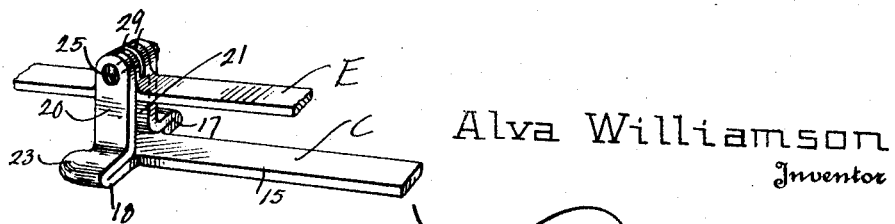
Alva Williamson
Inventor Patented Nov. 20, 1928.

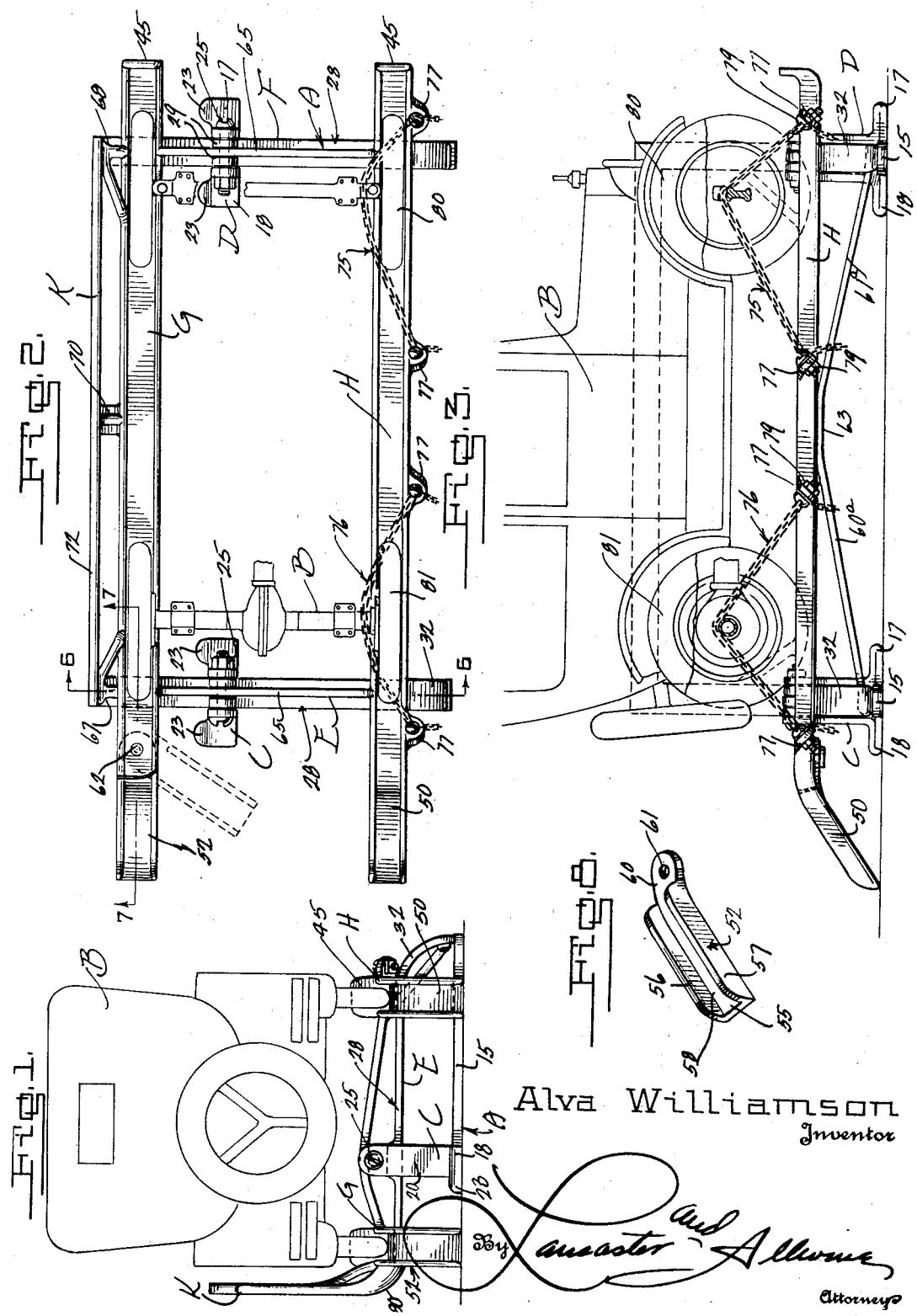

1,692,715

UNITED STATES PATENT OFFICE.

ALVA WILLIAMSON, OF SAN BERNARDINO, CALIFORNIA.

TILTING DEVICE FOR VEHICLES.

Application filed April 15, 1926. Serial No. 102,266.

This invention relates to improvements in vehicles supporting apparatus for adjusting and tilting the position of a vehicle so that normally inaccessible parts of the chassis may be rendered accessible by the tipping of the vehicle.

A further object of this invention is the provision of a frame for receiving a vehicle such as an automotive vehicle in such manner that the vehicle may with facility be tipped to an inclined position where the normally inaccessible lower parts of the chassis may be rendered accessible for convenient working thereon.

A further object of this invention is the provision of a vehicle tilting frame of the above generally mentioned character which embodies but few durably constructed and connected parts which will permit of an easy tilting of a vehicle supported thereon for reaching the lower parts of the chassis.

Other objects and advantages of this invention will be apparent during the course of the following detailed description.

In the accompanying drawings, forming a part of this specification, and wherein similar reference characters designate corresponding parts throughout the several views, Figure 1 is an end elevation of the improved tilting frame, showing the automotive vehicle supported thereon in a normal horizontal position.

Figure 2 is a plan view of the improved features of the tilting frame showing the relation thereof to the front and rear running gear of the chassis of a vehicle.

Figure 3 is a side elevation of the improved tilting frame showing the vehicle supported in a secured relation thereon prior to tilting.

Figure 4 is an end elevation of the details illustrated in Figure 1, with the improved frame tilted to incline the vehicle for access to the under parts of the chassis.

Figure 5 is a view of the details illustrated in Figure 4, with the improved tilting frame in its maximum tilted position for supporting the vehicle in a 90° overturned position.

Figures 6 and 7 are sectional views taken substantially on their respective lines in Figure 2 of the drawings.

Figure 8 is a perspective view of a track runway member for the tilting frame.

Figure 9 is a fragmentary perspective view showing a frame standard and beam pivoted thereto.

In the drawings, wherein for the purpose of illustration is shown only a preferred embodiment of this invention, the letter A may generally designate the improved tilting frame adapted to receive a vehicle B for tilting thereof. The frame A preferably comprises the rear and front standards C and D respectively pivotally supporting cross beams E and F, the said cross beams supporting at opposite sides of the pivot axis of the beams E and F, the longitudinal vehicle wheel receiving trackways G and H. The frame A furthermore includes the retaining portion K secured fixedly to the beams E and F and in a right angled relation therewith to hold the vehicle at a 90° inclined angle out of the normal vertical position of the vehicle.

The standards C and D are of identical formation and are best illustrated in the perspective view of Figure 9 of the drawings. They each comprise an elongated base 15, which is preferably of metal or analogous material, and of any desired weight. At one end thereof the same is laterally flanged in right angled relation with respect to its length, at opposite sides thereof, to provide supporting feet 17 and 18; the material being doubled upon itself to provide the supporting feet, and integrally connected therewith in spaced parallel upstanding relation are the preferably vertical standard legs 20 and 21. Short balance maintaining projections 23 are provided at the edges of the feet 17 and 18 opposite the edges thereof from which the supporting base 15 extends, as is illustrated in the drawings, these projections 23 being welded at this location and enabling the standards C and D to have a more stable support when the frame is being tipped.

Each of the standard legs 20 and 21 at the upper end thereof is transversely apertured, in aligning relation, for receiving a detachable pivot pin or screw 25 of any approved character.

The beams E and F are preferably of identical formation, and each of the same includes the elongated body portion 28, which intermediate the ends thereof is provided with the upstanding spaced lugs 29 apertured in aligning relation for receiving the pivot pin or element 25 therethrough whereby to pivotally support the cross beam E between the standard legs 20 and 21 of the standard or base portion C, and the beam F in similar manner to the base or standard construction D.

It is to be noted that the beam portion 28 of each of the beams E and F extends for a greater distance to one side of the pivot thereof than to the opposite side, and the portion of greater length, designated by numeral 31, extends above the elongated base 15 and in the same direction. At its outer end each of the portions 31 of the beams E and F is provided with a downturned preferably integral leg 32 which is adapted to engage at its lower edge with the top surface of the base 15 of the standard construction C or D immediately therebelow. This relation of parts is well illustrated in Figure 6 of the drawings where the beam E is shown as pivotally supported horizontally above the base portion 15 of the standard construction C.

The tracks G and H are arranged at right angles to the standards and beams above described, and connected as by welding in right angled relation to the beams E and F at opposite sides of the pivot axes thereof.

The tracks G and H are located in parallel relation with each other and with the axes on which the supporting beams E and F swing, with the axis of the track G disposed closer to the axes on which said beams swing than is the axis of the track H disposed, and whereby when a vehicle is supported on the tracks G and H the longitudinal center line of the vehicle and the longitudinal center of gravity of the vehicle will be disposed in an offset relation from the axes on which the beams E and F are disposed toward the track H. The tracks G and H are each of channel-shaped formation, including as is illustrated in Figure 6 of the drawings, the supporting base portion 40 which has the upstanding guide legs 41 and 42 at opposite sides thereof. Thus the tracks each provide an upwardly open longitudinal groove for receiving the wheels of the vehicle therein.

At the front end the tracks G and H are each provided with the upstanding abutment 45 in interfering relation with the wheel grooves of the channel trackways and against which the front wheels of the vehicle may abut to limit the movement of the same and to prevent the vehicle from forwardly running off the tracks, as is quite obvious.

In order to facilitate the running of the vehicle upwardly onto the tracks G and H, the said tracks at the rear ends thereof are each provided with the inclined runways illustrated in the drawings, the runway portion 50 of the track H being integral therewith and sloped so that the lower edge thereof will substantially abut the ground surface when the tracks are horizontally disposed for the driving of a vehicle thereonto. These runways of the tracks G and H may be inclined to any degree. The runway 52 of the track G is pivotally supported to the base portion 40 of the said track G at the rear end of the latter; the runway portion 52 being thus pivoted for lateral movement out of aligning relation with the trackway, into the space between the tracks G and H, in order to permit the tipping of the frame, as will be subsequently described. As is well illustrated in the perspective of Figure 8 and the sectional view of Figure 7, the pivoted runway 52 is provided with a base 55 having the upstanding guide legs 56 and 57 thereon which define the groove 58 which receives the wheels of the vehicle. At one end in projecting relation beyond the guide legs 56 and 57 is provided an attaching projection 60 apertured at 61, for receiving a pivot rivet or projection 62 therethrough whereby to pivotally connect the attaching lug or projection 60 beneath the base portion 40 at the rear end of the track G as illustrated in Figure 7. From this position the runway portion 52 may be swung laterally towards the trackway H into an acute angled relation with respect to the axis of the trackway G, as illustrated in Figure 2 of the drawings, in dotted lines, to permit tipping of the same and vehicle, as illustrated in Figures 4 and 5 of the drawings. When the runway 52 is aligned with its trackway G the vehicle receiving grooves or ways of the said runway and the tracks G are in alignment.

Reinforced connections for the trackways and beam and standard supports of the tilting frame are provided, as is illustrated in the various views of the drawings, and in connection with such reinforced connections it is preferred to provide brace arms 60ª and 61ª connected at their outer ends to the lower ends of the beam legs 42, as illustrated in Figure 3 of the drawings; said brace arms 60ª and 61ª extending upwardly in an inclined relation from their outer ends to a point immediately below the trackways and intermediate the ends of the trackways, substantially midway between the pivot beams E and F, where the said brace arms are welded or otherwise secured at 63 to the said trackways in a permanenty secured relation therewith.

Transverse braces 65 are provided for the trackways G and H at each of the pivot beams E and F; at the outer ends thereof the said braces 65 being welded or otherwise permanently secured to the facing legs of the tracks G and H, and extending therefrom in a bowed tautly bent relation over the pivot lugs 29 of the beams E and F.

In connection with the supporting construction K, which supports the vehicle in a horizontally tipped relation, the same comprises the vertical end arms 67 and 68, preferably integrally connected to the body portions 28 of each of the beams E and F, and in a right angled upstanding relation with respect to said body portions 28, at the outer ends of the said portions 28 adjacent the track H, and at the outer side of said track H. An intermediate vertical support 70 is also provided, rigidly secured at its lower end to the track G intermediate the pivot beams E and F. At their upper ends the vertical supports 67, 68 and 70 support in rigid manner a horizontal retaining rail 72; the arms 67, 68 and 70 and the rail 72 providing a substantially plane frame or wall which is adapted to abut and rest upon the ground or floor surface as illustrated in Figure 5 when it is preferred to horizontally tip and support the vehicle.

Referring to the retention and support of the vehicle on the tipping frame, the vehicle as can readily be understood, is run over the runways 50 and 52, onto the tracks G and H, and in this position, as above mentioned, the longitudinal center of the vehicle B is disposed laterally offset towards the track H with respect to the aligning pivot axes of the pivot beams E and F. When the vehicle B has been driven to the proper position on the tracks G and H the front and rear running gear and axles are chained in position by novel means consisting of front and rear cables 75 and 76, the ends of which are secured to inclined apertured lugs 77 which are integrally connected to the outer leg 42 of the track H, as illustrated in the drawings; these lugs being apertured for receiving adjusting bolts 79 by means of which the cables 75 and 76 may be drawn taut intermediate their ends about the axles and at the inner sides of the wheels 80 and 81 of the vehicle, and in this position it is obvious that the vehicle cannot move along the trackway, and is held onto the tracks G and H and more particularly the trackway H, to prevent tipping therefrom during the tipping of the vehicle B.

From the horizontal position illustrated in Figure 4 the vehicle B in its secured relation on the tipping frame may be readily tipped. First, however, the runway 52 of the track H must be moved laterally towards the track H to the dotted position illustrated in Figure 2, and the operator then by pulling down upon the side of the vehicle adjacent the track H or by pulling upwardly on the track H may readily tip the vehicle B due to the fact that the same is balanced with the pivot axes of the beams E and F, although with the weight slightly eccentric and greater in the direction of the track H. The vehicle B may thus be readily tipped upon the frame A, and the beams E and F move to an inclined position until the ends thereof adjacent the track G engage the ground or floor surface, and in which position the center of gravity of the vehicle B will be immediately over the pivot axes of the beams E and F, or slightly at the opposite side thereof from the elevated end of the vehicle, in order to retain the vehicle and frame in its tipped relation as illustrated in Figure 4 of the drawings, and this renders the under side of the chassis readily accessible from the elevated side of the vehicle, as is readily understandable.

If it is desired to tip the vehicle B to a horizontally tipped position, as illustrated in Figure 5, the same may be readily accomplished, by the pushing over of the vehicle B and the frame A from the tipped side of the vehicle in the tipped position illustrated in Figure 4, and the exertion required for such tipping will not be great, and is substantially a rocking movement due to the large radius of the arcuate surface 80 provided at the exterior surface at the juncture of the beams E and F with the vertical supporting arms 67 and 68 above mentioned. The tipping is continued until the supporting construction K horizontally rests on the ground or floor surface as illustrated in Figure 5, and in which position the beams E and F will be elevated off the ground surface, and the vehicle will lie in a horizontal position for complete access to the under side of the vehicle chassis.

As is illustrated in Figure 7 the frame portion K may be reinforced by diagonal braces 85 welded between the track G and the supports 67 and 68.

From the foregoing description of this invention it is apparent that a novel type of tipping frame has been provided for automotive vehicles, which will permit the ready tipping of the vehicle to have access to the parts thereof which are ordinarily inaccessible; the improved tipping frame embodying a relatively simple and compact construction which will not interfere with access to the vehicle, due to the open work nature thereof and the simple and efficient principle upon which the same operates.

Various changes in the shape, size, and arrangement of parts may be made to the form of invention herein shown and described, without departing from the spirit of the invention or the scope of the claims.

I claim:

1. In a vehicle tipping device the combination of a supporting base, an elongated frame pivotally mounted longitudinally thereof for transverse tipping, said frame having vehicle wheel receiving trackways thereon in parallel relation, and disposed parallel with respect to the pivot axis of the frame, one of said trackways being disposed closer to the pivot axis of the frame than the other trackway, that trackway which is disposed closest to the pivot axis of the frame having an inclined entrance and exit runway thereon pivotally mounted with respect to the trackway for swinging out of alignment therewith laterally toward the other trackway.

2. In a vehicle tipping device the combination of a supporting base, an elongated frame pivotally mounted longitudinally thereof for transverse tipping, said frame having vehicle wheel receiving trackways thereon in parallel relation, disposed parallel with respect to the pivot axis of the frame, one of said trackways being disposed closer to the pivot axis of the frame than the other trackway, that trackway which is disposed closest to the pivot axis of the frame having an inclined entrance and exit runway thereon pivotally mounted with respect to the trackway for swinging out of alignment therewith laterally toward the other trackway, the trackway which is most remote from the pivot axis of the frame having an inclined entrance and exit runway thereon rigid therewith and immovable therewith.

3. In a vehicle tipping device the combination of a supporting base construction, an elongated frame pivotally mounted on the base construction on an axis longitudinally of the frame so that the latter may be tipped to one side of the pivot axis to an inclined position, trackways on the frame, and an upstanding supporting wall rigid with the frame in transverse angled relation with respect to the plane in which the tracks lie, and of a nature to support a vehicle when in tipped position by resting upon a ground or other supporting surface with the base construction lifted off the ground.

4. In a vehicle tipping device the combination of spaced supporting standards including elongated base portions having upright standard portions at an outer end only of each, cross beams pivoted intermediate their ends to each of said standard portions, a trackway rigidly supported on similar ends of the cross beams to one side of the pivot axes of said cross beams and in a line parallel with the pivot axes of said cross beams, a second trackway mounted on said cross beams at the opposite side of the pivot axes of the cross beams with respect to the first trackway, and rigid legs on the cross beams spaced from the standards for engaging the base portions in spaced relation with the standards.

5. In a vehicle tipping device the combination of spaced supporting standards including elongated base portions having standard portions at an outer end of each, cross beams pivoted intermediate their ends to each of said standard portions, a trackway rigidly supported on similar ends of the cross beams to one side of the axes of said cross beams and in a line parallel with the pivot axes of said cross beams, a second trackway mounted on said cross beams at the opposite side of the pivot axes of the cross beams with respect to the first trackway, the last mentioned trackway being disposed parallel with the axes of the cross beams and disposed closer to the axes of the cross beams than is the first mentioned trackway, said trackways having inclined runways thereon, and the runway of the trackway which is closest to the axes of the cross beams being pivotally disposed on its respective trackway for movement into inclined alignment therewith or for movement laterally towards the other trackway into an out of the way position to permit tipping of the cross beams.

6. In a vehicle tipping device the combination of spaced supporting standards including elongated base portions having standard portions at an outer end of each, cross beams pivoted intermediate their ends to each of said standard portions, a trackway rigidly supported on similar ends of the cross beams to one side of the axes of said cross beams and in a line parallel with the pivot axes of said cross beams, a second trackway mounted on said cross beams at the opposite side of the pivot axes of the cross beams with respect to the first trackway, the last mentioned trackway being disposed parallel with the axes of the cross beams and disposed closer to the axes of the cross beams than is the first mentioned trackway, said trackways having inclined runways thereon, the runway of the trackway which is closest to the axes of the cross beams being pivotally disposed on its respective trackway for movement into inclined alignment therewith or for movement laterally towards the other trackway into an out of the way position to permit tipping of the cross beams, and an upstanding substantially right angled frame disposed at the outer side of the trackway which is closest to the pivot axes of the cross beams in substantially right angled relation with the cross beams and normal plane of the trackways.

7. In a vehicle tipping device the combination of a supporting base construction having upstanding spaced standard portions, substantially parallel disposed cross beams pivotally mounted intermediate their ends to the standard portions, an elongated track supported at similar outer ends of the cross beams in a line parallel with the pivot axes of the cross beams, depending legs on the outer ends of the cross beams adjacent said track adapted to engage a supporting surface to support the track in substantially a normal horizontal position, a second track supported on the beams in substantial parallelism with the axes of the cross beams and in a relation closer to the pivot axes than the first mentioned track is disposed whereby when a vehicle is supported on the tracks the longitudinal center thereof will be disposed slightly offset from the pivot axes of said beams towards that track which is disposed farthest from the pivot axes of said beams so that the weight of the vehicle will cause the tracks to assume a horizontal position from which it may be readily tipped by moving the cross beams on their pivot axes to lower that track which is closest disposed to the pivot axes of said cross beams.

8. In a vehicle tipping device the combination of a supporting base construction having upstanding spaced standard portions, substantial parallel disposed cross beams pivotally mounted intermediate their ends to the standard portions, an elongated track supported at similar outer ends of the cross beams in a line parallel with the pivot axes of the cross beams, depending legs on the outer ends of the cross beams adjacent said track adapted to engage a supporting surface to support the track in substantially a normal horizontal position, a second track supported on the beams in substantial parallelism with the axes of the cross beams and in a relation closer to the pivot axes than the first mentioned track is disposed, whereby when a vehicle is supported on the tracks the longitudinal center thereof will be disposed slightly offset from the pivot axes of said beams towards that track which is disposed farthest from the pivot axes of said beams so that the weight of the vehicle will cause the tracks to assume a horizontal position from which it may be readily tipped by moving the cross beams on their pivot axes to lower that track which is so disposed to the pivot axes of said cross beams, and an upstanding supporting frame carried by the cross beams along and immediately adjacent the outer side of that track which is disposed closest to the pivot axes of the cross beams in substantially a right angled upstanding relation with respect to the normal plane of the tracks.

9. In a vehicle tipping device of the class described the combination of a supporting base construction, an elongated frame pivotally mounted for transverse tipping to one side of said base construction, said elongated frame including vehicle wheel receiving tracks in parallel disposition at opposite sides of the pivot axes of said frame, and front and rear vehicle retaining cables connected at their ends to the frame at one side of the pivot axis of the frame and intermediate their ends said cables being adapted to be looped about the wheels at the side of the vehicle to be supported upon the frame and over the axles of the vehicle to retain the vehicle on the frame tracks against movement incident to tipping.

ALVA WILLIAMSON.